United States Patent [19]
McGee

[11] 3,789,875
[45] Feb. 5, 1974

[54] FLUID PRESSURE ACTUATED VALVE OPERATOR

[75] Inventor: John K. McGee, Houston, Tex.
[73] Assignee: Gray Tool Company, Houston, Tex.
[22] Filed: May 15, 1972
[21] Appl. No.: 253,512

[52] U.S. Cl................ 137/553, 137/554, 251/63.6, 251/14
[51] Int. Cl. ..................... F16k 31/143, F16k 37/00
[58] Field of Search..... 251/63.6, 14; 137/553, 557, 137/554

[56] References Cited
UNITED STATES PATENTS

| | | |
|---|---|---|
| 3,029,060 | 4/1962 | Anderson............................ 251/14 |
| 3,290,003 | 12/1966 | Kessler............................ 251/63.6 X |
| 3,378,224 | 4/1968 | Boyle.............................. 251/63.6 X |
| 3,402,912 | 9/1968 | Watkins........................... 251/63.6 X |
| 3,729,168 | 4/1973 | Natho............................. 251/63.6 X |

Primary Examiner—Arnold Rosenthal
Attorney, Agent, or Firm—Cushman, Darby & Cushman

[57] ABSTRACT

The valve operator preferably includes electrical or fluid pressure means for indicating the open or closed condition of the valve at a remote location. Means are provided for exerting additional valve operating force, should the normal manual and/or automatic actuator prove insufficient. The valve operator is constructed to be easily installed and serviced.

11 Claims, 3 Drawing Figures

UPPER PORTION

LOWER PORTION

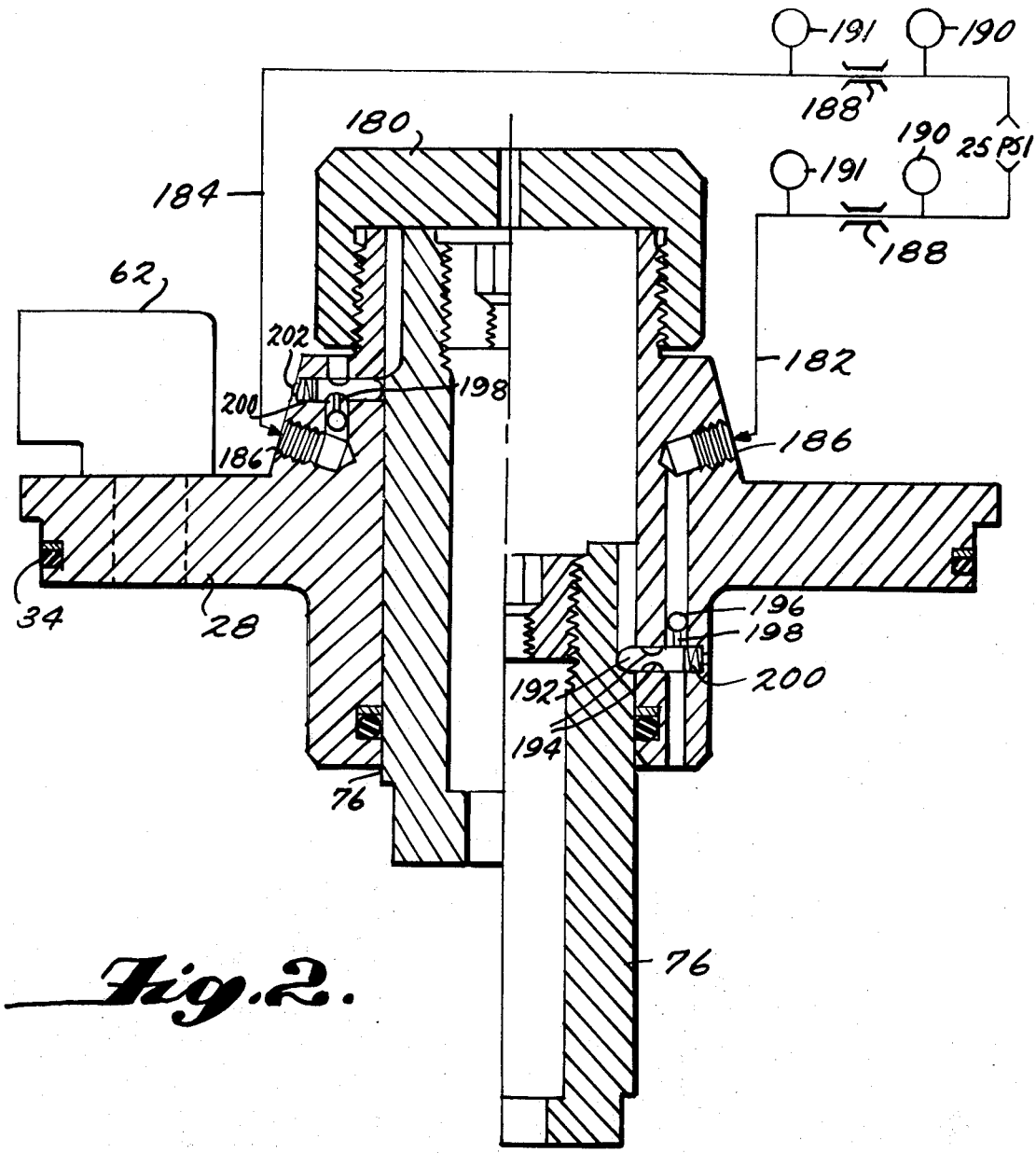

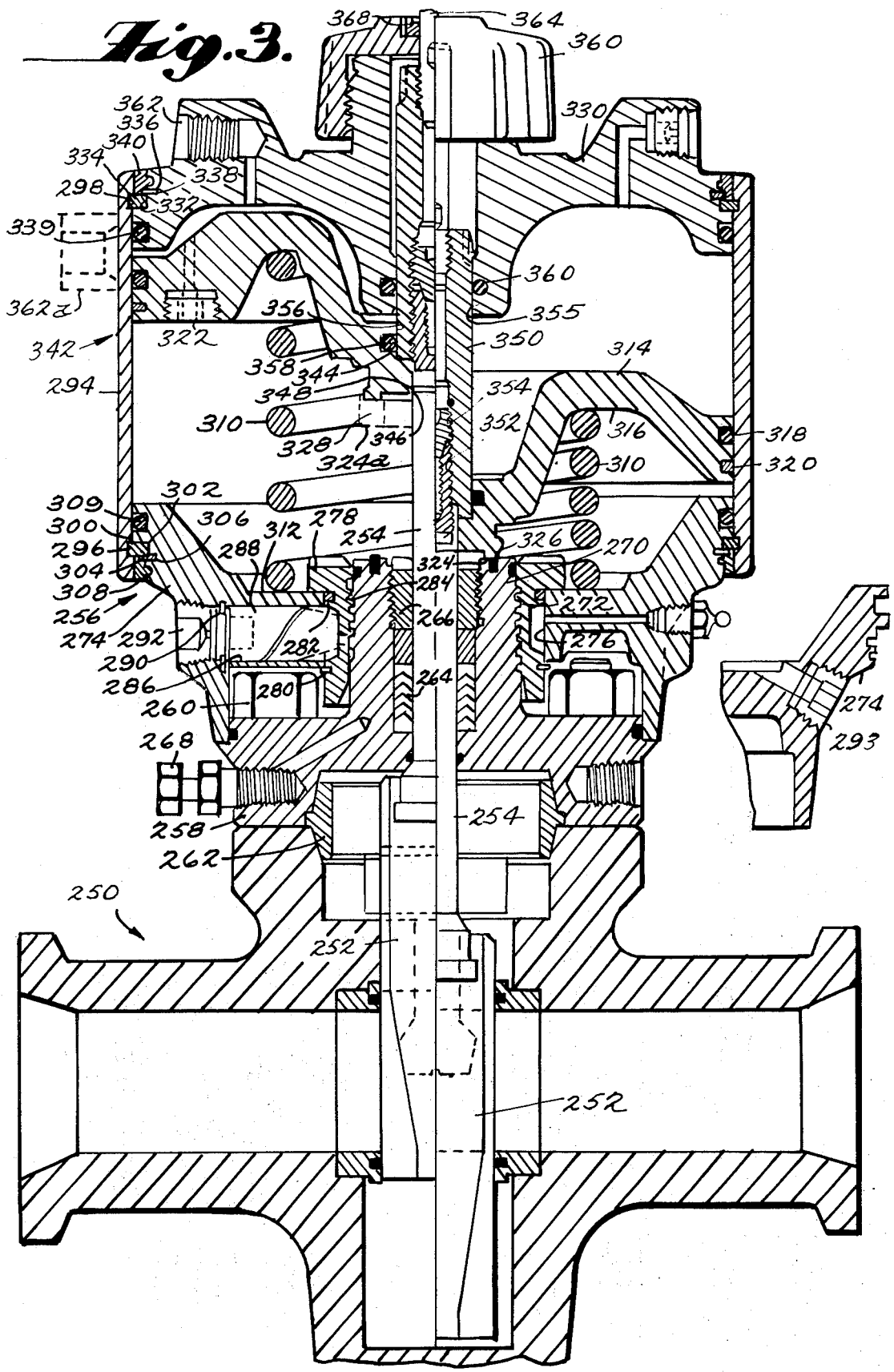

FLUID PRESSURE ACTUATED VALVE OPERATOR

BACKGROUND OF THE INVENTION

Often, in addition to or in place of manual means, industrial valves are provided with automatic operators, e.g. for opening or closing the valves in response to sensation of some changed condition. Representative equipment of the prior art may be found under the various valve headings of the past and current editions of the *Composite Catalog of Oil Field Equipment and Services*, Gulf Publishing Company, Houston, Texas, U.S.A.

SUMMARY OF THE INVENTION

The valve operator preferably includes electrical or fluid pressure means for indicating the open or closed condition of the valve at a remote location. Means are provided for exerting additional valve operating force, should the normal manual and/or automatic actuator prove insufficient. The valve operator is constructed to be easily installed and serviced.

The principles of the invention will be further hereinafter discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the drawings:

FIG. 2 is a longitudinal sectional view, similar to the upper portion of FIG. 1, of a modification of the condition indicating means.

Figure 1:
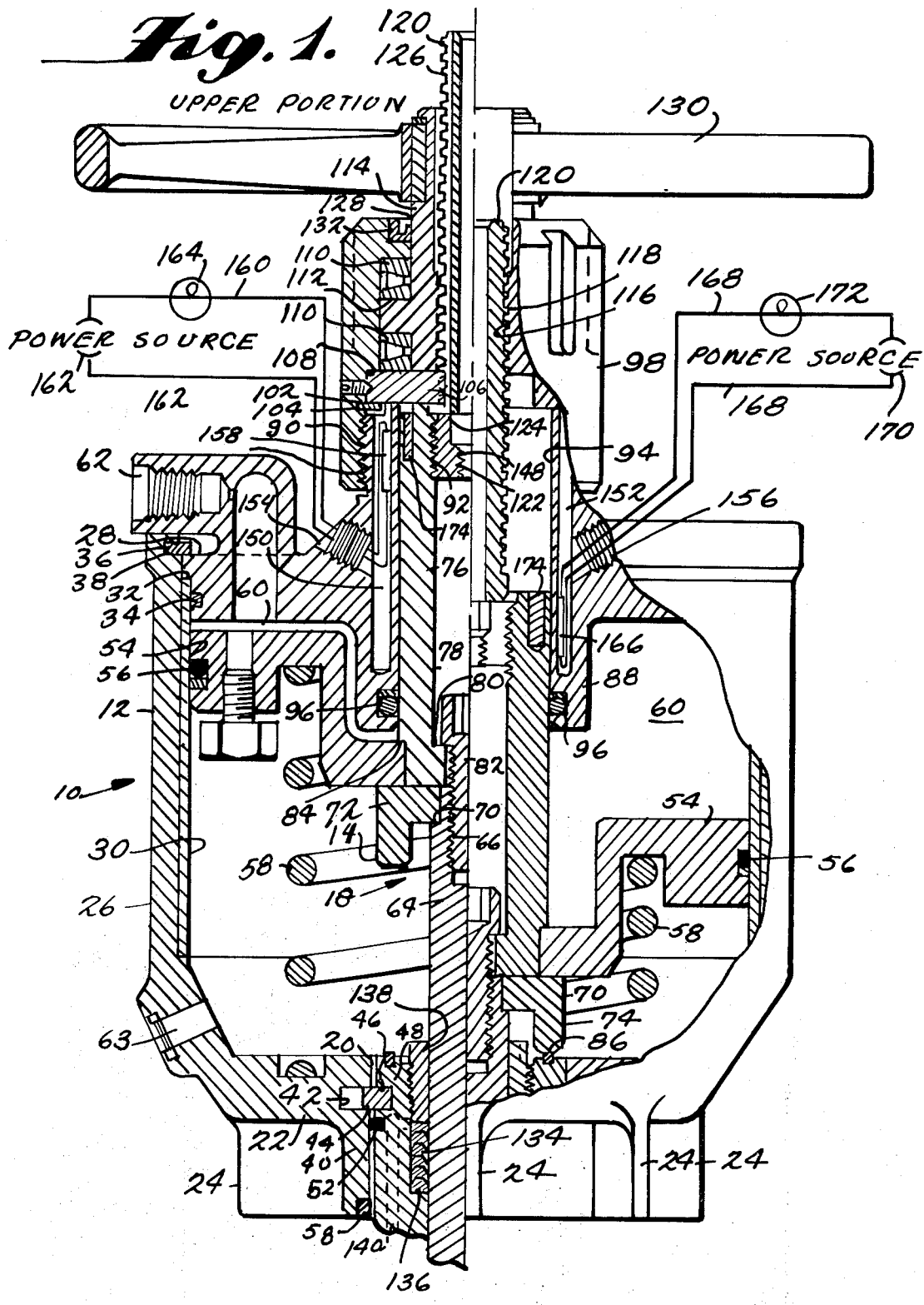
FIG. 1 is a longitudinal sectional view of a gate valve equipped with one embodiment of the operator in accordance with the present invention.
Figure 1:
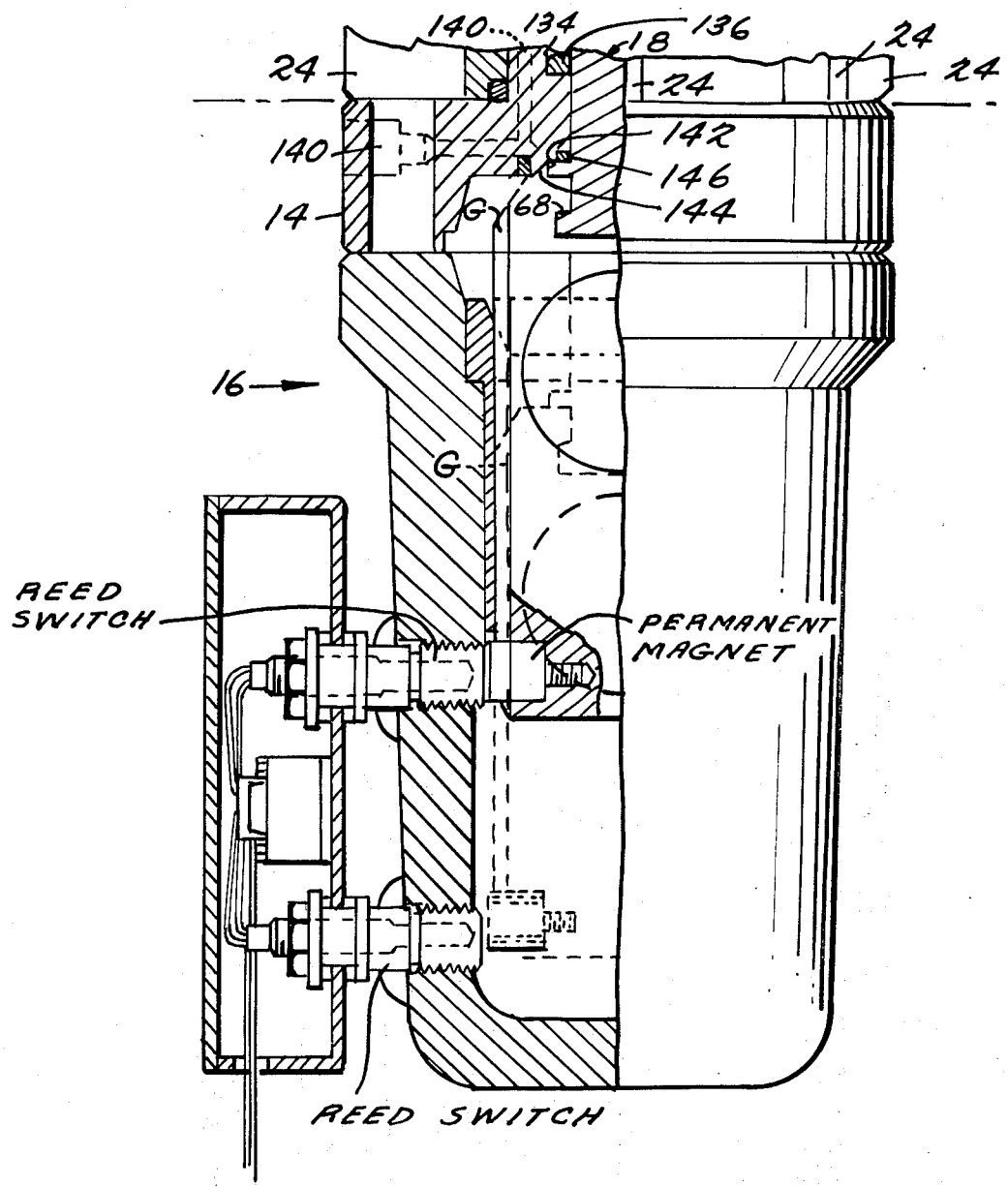

In both of the figures, the left half of the figure depicts the operator at one extreme of its operation and the right half depicts it at the other extreme. For the particular valve depicted, the left side represents a closed condition and the right side represents an open condition.

FIG. 3 is a longitudinal sectional view of a valve having a modified fluid pressure actuated operator.

DETAILED DESCRIPTION OF THE PRESENTLY PREFERRED EMBODIMENTS

The valve operator 10 includes a housing 12 which mounts a bonnet 14 for interfacing the operator housing with a valve, such as a gate valve 16 to be operated. Within the housing 12, a mechanism 18 disconnectably connects with the valve gate G for opening and closing the valve.

In the construction depicted, the housing 12 is generally cup-shaped, having a central, elongated bore 20 through the bottom 22, strengthened with respect to the main portion of the housing by exterior integral ribs 24. The sidewall 26 of the housing 12 is generally tubular cylindrical and upwardly terminates in a mouth closed by an annular cylinder cap 28. The wall 26 is shown lined by a tubular cylinder liner 30 whose upper end provides an annular ledge 32 upon which the cylinder cap mounts. The cylinder cap is sealed to the cylinder liner by a resilient seal at 34.

The cylinder cap 28 is shown removably mounted in place by a split retainer ring 36 protruding from an internal circumferential groove 38 in the wall 26 into engagement with the exterior of the cap 28.

Likewise, the tubular neck 40 surrounding the bore 20 is internally provided with a circumferential groove 42 from which resiliently protrudes a split retainer ring 44. The latter also protrudes into an external groove 46 provided on a tubular neck 48 of the bonnet 14. The neck 48 is axially slidably received in the bore 20 to permit disconnectable connection therein via the retainer ring 44. The neck 48 is resiliently sealed with respect to the bonnet 14 at 50 and 52.

Within the housing, a slidable annular piston 54 resiliently seals with the liner 30 at 56. The piston 54 is supported toward a raised position (left half of FIG. 1) with respect to the housing, by a compression coil spring 58 which works against the floor of the housing and the underside of the piston 54. To overcome the spring force to remotely operate the valve, pressurized fluid is admitted to the chamber 60 within the housing 12 above the piston 54 via a fluid inlet port 62 through the cylinder cap.

Below the inlet port 62, the piston 54 is fitted with a replaceable, frangible-disk pressure safety device set to operate should the pilot pressure admitted to the chamber for forcing the piston down exceed design pressure by a preselected amount, e.g. due to some upstream malfunction.

The housing 12 is vented at 63 below the piston 54.

The operating mechanism 18 includes a main stem 64 which has a threaded socket 66 formed axially in its upper end and shoulder means 68 at its lower end for connecting e.g. a valve gate G thereto. Intermediate these ends, the stem 64 is generally cylindrical.

Adjacent and leading to its upper end, the stem 64 is provided with a circumferential recess that includes an upwardly facing shoulder 70. An annular travel limit cap 72 having an outer depending skirt 74 is received over the upper end of the stem 64 and supported on the shoulder 70.

As shown, the upper end of the travel limit cap 72 is flush with the upper end of the stem 64. A tubular upper stem 76 is provided having a lower end butted against the upper ends of the travel limit cap and main stem. The lower end region of the bore 78 is reduced in diameter at a point to provide an upwardly facing shoulder 80. The upper stem and main stem are connected together as continuations of one another by a bolt 82 received in the bore 78 and threaded into the threaded socket 66 until its head tightly engages the shoulder 80.

At its radially inner extent, the piston 54 fits in an exterior circumferential recess 84 between the end region of the upper stem 76 and the travel limit cap. Thus, the single bolt 82 holds together as a unit: the main stem, the upper stem, the piston and the travel limit cap. When this assembly is in its lowermost position (right half of FIG. 1) the skirt of the travel limit cap strikes an annular travel stop ring 86 mounted in an annular recess in the upper end of the tubular neck of the bonnet 14.

The cylinder cap 28, at its radially innermost extent merges with the lower end of an upwardly extending tubular sleeve 88 which is externally threaded at 90 adjacent its upper end. The tubular upper stem 76 is internally threaded at 92 adjacent its upper end.

The upper stem 76 is slidably received in the bore 94 of the tubular sleeve 88, with the sleeve acting as a bearing for the upper stem. An internal recess 96 in the sleeve receives a resilient seal ring which seals with the exterior of the upper stem.

In the embodiment shown in FIG. 1, the exterior threading 90 permits an internally threaded cap 98 to be secured centrally on the annular cylinder cap 28. Above the threading 100 within the bore of the cap 98 there is a circumferential groove 102 which receives a retainer ring 104 in order to fasten a key 106 into a recess 108 defined in the bore above the groove 102. Above the key 106 there are provided two axially spaced sets of roller bearings 110. These mount between them the exteriorly radiating flange 112 of a tubular stem nut 114. The lower end of the stem nut 114 lies adjacent the upper extent of the key, but is not rotationally obstructed thereby. The stem nut 114 is internally threaded at 116 to threadably mate with corresponding external threading 118 on a manual operation stem 120.

The internal threading 92 in the tubular upper stem 76 threadably receives a tubular plug 122 whose upper end surface 124 provides a bearing surface for the lower end of the manual operation stem 120.

The externally threaded manual operation stem is provided with a longitudinal keyway 126 in which the key 106 is received.

The stem nut 114 projects axially out through a central opening 128 in the cap 98. Exteriorly of the cap 98, a handwheel 130 is shown secured on the stem nut 114. Accordingly, when the handwheel 130 is rotated, the stem nut will rotate but not move axially, but the manual operation stem threadably engaged therewith is restrained against rotation by the key 106, so moves axially upwardly or downwardly, depending upon the sense of the handwheel rotation. Pushing the tubular plug 122 down by rotating the handwheel results in the upper stem being pushed down, pushing the piston 54 down with it, causing the valve to be operated just as if fluid pressure had been admitted to the valve housing chamber to push the piston down. Reversal of rotation of the handwheel raises the manual operaton stem so the compression coil spring can raise the piston 54 as described hereinbefore.

If, during manual or automatic operation, the compression coil spring will not raise the piston once permitted to do so, extra lifting force may be applied by threading the lower end of a rod (not shown) into internal threading 148 in the plug 122 (reached from the outside through the tubular manual operation stem 120) and pulling upwardly.

A seal between the cap 98 and the stem nut 114 is provided at 132.

A seal between the main stem and the bonnet 14 is shown provided in the form of an annular internal recess 134 in the upper end of the tubular neck of the bonnet. The recess 134 receives chevron packing 136 backed by a gland nut 138. The packing 136 may be periodically refurnished with sealant via a passageway 140 leading out through the bonnet. The passageway 140 is normally otherwise plugged. Furthermore, when the valve gate is open, so that the main stem is in its uppermost position, an annular, circumferentially extending metal sealing surface 142 on a flange on the main stem seats against and seals with a complementary metal seat 144 provided in the form of a chamfered corner on the bonnet 14 at the base of its tubular neck. A circumferentially extending PTFE ring 146 received in a recess immediately adjacent the surface 144 backs the seal at 142,144.

Also in the embodiment depicted in FIG. 1, there are two diametrically opposed, axially extending passages 150,152 formed in the sleeve of the cylinder cap. The passages 150,152 are formed through the upper end of this sleeve and proceed down to near the lower extent of the sleeve. Each passage 150,152 is communicated to the exterior of the operator 10 by a respective intersecting passageway 154,156.

A first reed switch 158 is received and mounted in the passage 150 near the upper extent thereof; its leads 160 pass down through the passage 150, out through the passageway 154 to form a part of an external circuit which includes a power source 162 and an electrically operable indicator 164, such as a light.

A second reed switch 166 is received and mounted in the passage 152 near the lower extent thereof; its leads 168 pass up through the passage 152, out through the passageway 156 to form a part of an external circuit which includes a power source 170 and an electrically operable indicator 172, such as a light.

Permanent magnet means 174 are mounted in the upper end of the tubular upper stem to excite the first reed switch 158 only when the valve operating mechanism is in its raised condition (as shown at the left in FIG. 1) and to excite the second reed switch 166 only when the valve operating mechanism is in its lowered condition (as shown at the right in FIG. 1). The circuits in which the indicators 164 and 172 are included may include long electrical cables and/or signal transmitting and receiving means so the indications of whether the valve is fully open or fully closed may be assessed at a distance. (If it were necessary or desirable to do so, a third reed switch, actuator and indicator circuit could be provided for actuation angularly and axially intermediate the two systems shown to provide an external indication of when the valve is part way open. In that way, one can be assured by positive, e.g. electrically operated, visual indicator means whether the valve is fully open, partly open, or closed and that if no indicator is indicating, the indicator systems are not functioning correctly.)

Although a handwheel has been depicted in FIG. 1 for alternative manual operation of the valve operator it may be unneeded or not wanted in some instances wherein it is a simple matter to remove the entire manual operation assembly by simply unscrewing the annular cap 98. That cap and the parts which come away with it may be replaced with a simple cup-shaped blind cap (such as is depicted in FIG. 2).

In FIG. 2, two modifications are shown: the annular cap 98 (and manual operation assembly) have been replaced by a blind cap 180, and the electrically operated position indicating systems have been replaced by ones which operate on pressurized fluid. As with the systems shown in FIG. 1, the FIG. 2 indicator systems work between the upper stem and the cylinder cap to provide an external indication. However, the elements shown provided in or on the cylinder cap could be provided on the cap 98 or 180.

In operation of the FIG. 2 indicating system assume an air supply pressure of 25 psi, in the lines 182 and 184, leading to the air inlet ports 186 are orifices 188 with pressure gauges 190 upstream, and pressure gauges 191 downstream thereof. The pressure drop against the respective orifice would be approximately 10 psi, thus 15 psi woyld be the downstream pressure. The triggers 192 are undercut at 194, and the ball checks 196 have a small actuating pin 198 through the seats. Starting with the valve closed, the trigger 192 is compressed to spring 200, allowing pin 198 to project into undercut 194 and the check valve to close. With the gate valve in a closed position, as air will not be moving in line 184, gauges 190 and 191 would each indicate the same pressure; i.e. 25 psi. Referring to the left half of FIG. 2, when the gate valve was opened, the trigger would move inwardly a small amount, allowing the ball check to open. Then, the differential pressure would be indicated across the orifice. Air would escape through vent 202.

Referring to the right half of FIG. 2, while the gate valve was approaching its open position, the trigger 192 would be in a retracted position and the ball check closed. Thus, pressure on either side of the orifice 188 would be equalized. As the upper stem moves further downward, the trigger 192 enters into the undercut 194, causing the pin 198 to move the ball 196 from its seat. Here, again, air movement in line 182 would indicate a pressure differential across the orifice in this line. In other words, when the valve is closed, pressures on either side of the orifices would be equal, while with the valve open, a differential pressure is indicated.

It will be recognized that the bonnet and upper stem of the operator could be manufactured without sensing devices, i.e. a plain bonnet and upper stem. Visual means to indicate the valve being either open or closed could be accomplished by having a rod threaded into the threads of the tubular plug 122, and its length of extension through an annular cap or manual override device annular cap 98 (FIG. 1) observed.

Thus, it should be apparent that the electrical indicating means could be provided with the manual override valve operator option shown in FIG. 1 or with the necessarily automatically operated blind cap-provided version of FIG. 2, and likewise, that the pressurized fluid-based indicating means depicted in FIG. 2 could replace the electrically-powered indicating means of FIG. 1.

Because of the aforedescribed metal-to-metal seal provided between the valve operator main stem and the bonnet 14 when the valve is closed, the operator housing and parts other than the valve operator main stem may be safely removed when the valve is closed. Such removal may be needed if the chevron packing leaks or parts within the operator housing need attention. Also, if it is desired to leave the housing 12 attached to the bonnet 14, removal of the bolt connecting the upper stem to the main stem, and removal of the retainer between the housing and the cylinder cap permits removal of the cylinder cap and access to parts within the housing. In such instance, caution is advised, because upon removal of the retainer, the compression spring within the housing will attempt to recover, causing an upward force on the cylinder cap.

The operator is particularly suited for use with a gate valve, but may be used with other valves amenable to operation by a reciprocating operator. Likewise, the operator 10 may provide like reciprocation for operation of any reciprocably operated device, be it a valve or some other equipment. A typical valve with which the operator may be used is the Graygate through-conduit gate valve manufactured by Gray Tool Company of Houston, Texas, U.S.A.

In FIG. 3 there is depicted a gate valve 250 having a gate 252 provided with means for securement to a valve stem 254 for raising (FIG. 3, left half) and lowering (FIG. 3, right half) the gate, to close and open the valve. The valve 250 is shown equipped with a pneumatic operator 256.

The operator 256 includes an annular bonnet 258 adapted to be sealingly secured upon the valve by conventional means 260,262. The valve stem 254 extends through the bonnet and is sealed with respect thereto by conventional chevron packing 264 backed by a gland nut 266. Port means 268 may be provided for energizing the packing with plastic sealant and/or for monitoring the sealed area for leakage. So much of the operator has been described so far, i.e. the bonnet 258 and packing 264, may be preinstalled upon the valve 250.

The bonnet 258 includes a coaxially upwardly projecting, upper tubular portion 270 which is externally helically threaded at 272.

The valve operator 256 further includes an annular lower housing 274 having a vertical bore 276 in which a tubular bonnet drive gear 278 is mounted via a snap ring 280. The bonnet drive gear is sealed to the bore 276 by a sealing ring 282. The bonnet drive gear is internally threaded at 284 to mate with the bonnet threading at 272.

The lower housing has a lateral bore 286 which intersects with the bonnet drive gear. The bore 286 mounts a bonnet drive pinion 288 using a snap ring 290. The pinion 288 has a socket 292 accessable from the exterior. Thus, rotation of the pinion 288 about its own axis forces rotation of the bonnet drive gear. This motion is used, as will be described below, to mount the operator housing on the bonnet. Ninety degrees from the plane of FIG. 3, the lower housing is ported at 293 to accommodate downward movement of the piston 314.

After the bonnet drive gear and bonnet drive pinion have been installed in the lower housing, but before the lower housing is installed on the bonnet, assembly of the operator continues. A tubular cylinder 294 is provided having two inwardly opening circumferential grooves 296,298, one near the lower end thereof and the other near the upper end thereof. The cylinder is slipped over the lower housing, a three-piece retainer ring 300 installed in the groove 296 and in a complementary recess 302 in the outer periphery of the lower housing. The retainer is locked in place with a snap ring 304 received in a groove 306 within the recess in the outer periphery of the lower housing and a weather seal 308 is installed covering the snap ring and retainer. The lower housing is sealed with respect to the cylinder by a seal member 309.

A coil spring 310 is then coaxially placed in the cylinder 294 so that its lower end rests on the lower housing surface 312 peripherally adjacent the bonnet drive gear.

A piston 314 is placed upon the upper end of the spring. The piston 314 is annular and generally shaped like an inverted gelatin dessert ring mold. The spring bears against the inverted trough 316 of the piston, intermediate the radial extent of the piston. The radially outer extent of the piston is provided with seal means 318,320 for sealing with the internal surface of the cylinder. For safety reasons, the piston 314 preferably includes a safety check valve 322 for permitting pressure to bypass the piston when, through error, too much valve opening pressure is supplied to the valve operator.

As can be seen by comparing the left and right halves of FIG. 3, downward travel of the piston 314 within the cylinder is limited by contact of the stop surface 324 on the piston with the stop surface 326 on the bonnet radially adjacent the packing nut 266. When the operator is being used to operate valves having a shorter stroke between fully open and closed conditions, a stroke conversion spacer 328, e.g. a shim, may be mounted axially between the stop surfaces 324 and 326. The spacer 328 is suggested by phantom lines as mounted on the underside of the piston 314, to provide thereon a stop surface 324a.

After the piston 314 has been placed on the spring 310, an annular upper housing 330 is placed on the piston. Downward pressure is exerted on the upper housing 330 sufficient to compress the spring 310 by an amount needed to place the recess 332 in the radially outer peripheral surface of the upper housing 330 at the level of the groove 298 in the cylinder. While holding this position, the assembler inserts another three-sector retainer 334 in the recess 332 and groove 298 and locks it in place by installing a snap ring 336 in the groove 338 in the recess 332. A weather seal 340 is installed to cover the retainer 334 and snap ring 336. The upper housing is sealed to the cylinder at 339.

After the operator housing 342, including the upper and lower housing assembled to the cylinder and containing the spring and piston, has been put together as just described, it may be installed on the previously installed bonnet by simply lowering the operator housing 342 over the valve stem 254 until the bonnet drive gear 278 coaxially rests upon the exteriorly threaded neck 270. Then, rotation of the bonnet drive pinion using an exteriorly applied wrench or the like, causes engagement of the threads 272 and 284, pulls the operator housing down upon the bonnet and secures the former upon the latter.

The piston 314 central bore 344 includes a downwardly facing shoulder 346 which becomes supported upon an upwardly facing shoulder 348 on the valve stem.

A tubular, exteriorly cylindrical upper stem 350 is provided having internal threading 352 in the lower portion of the bore thereof. A lock screw 354 is threaded into this bore at the proper height for the particular installation, then the upper stem is inserted through a coaxial opening 355 in the upper housing and is threaded onto complementary external threading on the valve stem 254 until the lock screw 354 engages the valve stem 254. At this point the lower end of the upper stem has entered and bottomed in an upwardly opening annular recess 356 in the piston 314. The upper stem is sealed with respect to the piston at 358 and with respect to the upper housing at 360. Thus the upper stem unites the piston with the valve stem and provides journalling for the vertical sliding piston movement.

Pressure for depressing the piston to open the valve against restorative force exerted by compression of the spring 310 is admitted to the housing via a nipple 362 installed on the upper housing (or a nipple 362a installed on the cylinder, above the piston).

The FIG. 3 structure is completed by an indicator stem 364 threaded into the upper end of the upper stem and extending out through the upper end of the bore of the upper housing. An annular cap 366 threaded onto the upper housing peripherally of the bore passes the indicator stem 364 and is sealed with respect thereto at 368. As appears, the indicator stem is projected upwardly when the valve is closed and retreats downwardly when the valve is open to provide a visual indication of the condition of the valve. If need be, the indicator stem may be unthreaded from the upper stem and a tool threaded in its place for applying mechanical pressure to the valve stem for opening or closing the valve when, for any reason, the operator is not functioning as required.

It should be apparent that the electrically or pneumatically powered remote indications of the valve's condition described in relation to FIGS. 1 and 2, respectively, and the manual hand wheel operator, described in relation to FIG. 1, may be installed on the valve of FIG. 3.

It should now be apparent that the fluid pressure actuated valve operator as described hereinabove possesses each of the attributes set forth in the specification under the heading "Summary of the Invention" hereinbefore. Because the fluid pressure actuated valve operator of the invention can be modified to some extent without departing from the principles of the invention as they have been outlined and explained in this specification, the present invention should be understood as encompassing all such modifications as are within the spirit and scope of the following claims.

What is claimed is:

1. An operator mountable on equipment such as a gate valve for reciprocating a reciprocable element thereof such as a gate valve gate, comprising:

an annular bonnet member having securement means thereon for fixedly securing the bonnet on the equipment; said bonnet having a bore for reciprocably receiving a portion of the element to be reciprocated; and packing means received in said bore for sealing against the element to be reciprocated;

a cylinder member including tubular sidewall means closed at opposite ends by upper and lower annular end wall means defining a housing with said cylinder;

means sealing and securing the lower annular end wall coaxially upon the bonnet so the element to be reciprocated may protrude up into within the cylinder;

means defining external helical threading circumferentially on said bonnet;

an annular bonnet drive gear; means co-axially mounting the bonnet drive gear in the bore of said lower annular end wall means; said annular bonnet drive gear having means defining internal helical threading thereon which is complementary with the external helical threading defined on the bonnet;

a bonnet drive pinion mounted on the lower end wall means in meshing engagement with the bonnet drive gear and accessable from exteriorly of said operator, so that the bonnet drive pinion, upon being rotated from exteriorly of the operator, rotates the bonnet drive gear to engage said threading when rotated in one angular sense and to disengage said threading when rotated in the opposite angular sense;

an annular piston slidingly coaxially received within the cylinder, means sealing the outer peripheral extent of the piston with respect to the inner periphery of the tubular sidewall means of the cylinder;

port means on said cylinder for admitting and releasing pressurized fluid to and from the cylinder above the piston for reciprocating the piston;

port means on said cylinder below the piston for admitting and exhausting fluid to and from the cylinder below the piston to permit the piston to reciprocate in response to admission and release of said pressurized fluid above the piston;

a compression coil spring coaxially mounted to bear at one end against the housing and to resiliently urge the piston toward adjacency with the upper end wall means;

annular sealing means in the bore of said cylinder annular upper end wall means;

an upper stem slidingly received in the last-mentioned bore and sealed with respect thereto by the last-mentioned sealing means; said upper stem having downwardly facing shoulder means near the lower end thereof, the upper stem being insertable through the bore of said piston down to said shoulder means; and said upper stem having securement means thereon below said shoulder means for removably securing the lower end of the upper stem to the element to be reciprocated, within the cylinder, with the piston abutting the shoulder means.

2. The operator of claim 1 further including cooperating stop means mounted to move with said piston and interiorly of the cylinder adjacent the lower extent thereof, engageable to positively limit downward movement of the piston.

3. The operator of claim 2 wherein the stop means mounted with the piston includes removable shim means selectively installable for reducing the permitted downward movement of the piston.

4. The operator of claim 1 wherein the tubular sidewall means of the cylinder and the upper end wall means thereof are disassembleable from one another and said operator includes means removably securing the upper end wall means to the tubular sidewall means and means sealing the upper end wall means with respect to the tubular sidewall means.

5. The operator of claim 4 wherein the tubular sidewall means and the lower end wall means of the cylinder are disassembleable from one another and said operator includes means removably securing the lower end wall means to the tubular sidewall means and means sealing the lower end wall means with respect to the tubular sidewall means.

6. The operator of claim 1 further including indicator means upwardly extending to exteriorly of the cylinder from the upper stem through the upper end wall means for providing a visual indication of the relative vertical disposition of the reciprocable element.

7. The operator of claim 1 including at least two vertically spaced sensors mounted on the upper end wall means, and a sensor triggering device mounted on the upper stem in such disposition as to trigger one of the sensors as the piston is depressed by admission of pressurized fluid to the cylinder above the piston and to trigger the other of the sensors as the pressurized fluid is released and the spring causes the piston to raise to adjacency with the upper end wall means; and indicator means disposed externally of the cylinder and operatively connected to the sensors for providing an external indication of the disposition of the reciprocating element.

8. The operator of claim 7 wherein the sensors are reed switches and the sensor triggering device comprises permanent magnet means for operating the reed switches.

9. The operator of claim 7 wherein the sensors are actuators of valves communicated by conduit means to a supply of pressurized fluid and the sensor triggering device comprises surface means on the upper stem engageable with the valve actuators for actuating the valves; and wherein the indicator means comprise pressure gauge means interposed in said conduit means.

10. The operator of claim 1 further including securement means on said upper stem, accessable from exteriorly of the operator, for attachment of means for applying mechanical force for raising and lowering the upper stem to reciprocate the reciprocable element.

11. The operator of claim 10 wherein hand wheel means are secured to said securement means for manually reciprocating the reciprocable element.

* * * * *